United States Patent
Lee et al.

(10) Patent No.: US 11,475,114 B2
(45) Date of Patent: Oct. 18, 2022

(54) TERMINAL AND CONTROL METHOD THEREOF

(71) Applicant: HiDeep Inc., Seongnam-si (KR)

(72) Inventors: Sein Lee, Seongnam-si (KR); Youngho Cho, Seongnam-si (KR); Seyeob Kim, Seongnam-si (KR); Byung Duck Cho, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 349 days.

(21) Appl. No.: 16/613,205

(22) PCT Filed: Jun. 4, 2018

(86) PCT No.: PCT/KR2018/006348
§ 371 (c)(1),
(2) Date: Nov. 13, 2019

(87) PCT Pub. No.: WO2018/230875
PCT Pub. Date: Dec. 20, 2018

(65) Prior Publication Data
US 2020/0175143 A1 Jun. 4, 2020

(30) Foreign Application Priority Data
Jun. 12, 2017 (KR) .................. 10-2017-0073104

(51) Int. Cl.
*G06F 21/32* (2013.01)
*G06F 3/041* (2006.01)
(Continued)

(52) U.S. Cl.
CPC ............ *G06F 21/32* (2013.01); *G06F 3/0443* (2019.05); *G06F 3/0446* (2019.05); *G06F 21/45* (2013.01);
(Continued)

(58) Field of Classification Search
CPC ................ G06F 21/32; G06F 21/45; G06V 40/12–1394
See application file for complete search history.

(56) References Cited

U.S. PATENT DOCUMENTS

| 9,542,783 B2* | 1/2017 | Slaby | G06F 21/45 |
| 10,007,772 B2* | 6/2018 | Slaby | G06F 21/32 |

(Continued)

FOREIGN PATENT DOCUMENTS

| CN | 102566840 | 7/2012 |
| CN | 104077516 | 10/2014 |

(Continued)

OTHER PUBLICATIONS

SIPO, Search Report of CN 201880039891.8 dated Feb. 18, 2021.
(Continued)

*Primary Examiner* — Patrick F Marinelli
(74) *Attorney, Agent, or Firm* — Lex IP Meister, PLLC

(57) ABSTRACT

A terminal for checking a security request level of a fingerprint verification request is provided. The terminal includes a fingerprint recognition sensor configured to acquire a fingerprint image; and a controller configured to check a security request level of a fingerprint verification request when the fingerprint verification request is received, to determine an verification level depending on the security request level, and to perform fingerprint verification in a manner corresponding to the verification level by using the fingerprint image. The controller controls the fingerprint recognition sensor to acquire a fingerprint image of a first level when the security request level is less than or equal to the security request level of a previous verification request that has been completed before the fingerprint verification request, and an elapsed time from the previous verification request is within a threshold time.

18 Claims, 17 Drawing Sheets

(51) Int. Cl.
*G06F 21/45* (2013.01)
*G06V 40/12* (2022.01)
*G06F 3/044* (2006.01)
*G06V 40/13* (2022.01)

(52) U.S. Cl.
CPC ...... *G06V 40/1306* (2022.01); *G06V 40/1376* (2022.01); *G06F 2203/04105* (2013.01)

(56) References Cited

U.S. PATENT DOCUMENTS

| | | | |
|---|---|---|---|
| 10,909,226 B2* | 2/2021 | Baek | A61B 5/742 |
| 11,036,840 B2* | 6/2021 | Huang | G06V 40/1365 |
| 11,238,422 B1* | 2/2022 | Eidam | G06Q 20/40145 |
| 11,243,755 B1* | 2/2022 | Lanner | G06F 8/65 |
| 11,244,132 B2* | 2/2022 | Lee | G06K 7/1098 |
| 11,245,726 B1* | 2/2022 | Kats | H04L 63/20 |
| 11,295,294 B1* | 4/2022 | Kurani | G06Q 20/36 |
| 2012/0127179 A1 | 5/2012 | Aspelin | |
| 2012/0313753 A1 | 12/2012 | Miller | |
| 2013/0278383 A1* | 10/2013 | Boshra | G06F 21/32 340/5.83 |
| 2013/0279768 A1* | 10/2013 | Boshra | G06F 21/32 382/124 |
| 2013/0298224 A1* | 11/2013 | Heilpern | G06F 21/32 726/19 |
| 2014/0344896 A1 | 11/2014 | Pak et al. | |
| 2015/0047017 A1 | 2/2015 | Kim et al. | |
| 2015/0137938 A1* | 5/2015 | Slaby | G06V 40/1365 340/5.53 |
| 2016/0147987 A1 | 5/2016 | Jang et al. | |
| 2017/0124316 A1* | 5/2017 | Slaby | G06F 21/45 |
| 2017/0364238 A1* | 12/2017 | Kim | G06F 16/275 |
| 2018/0203986 A1* | 7/2018 | Huang | H04L 9/3231 |
| 2020/0175143 A1* | 6/2020 | Lee | G06F 3/0446 |
| 2020/0184056 A1* | 6/2020 | Thörnblom | G06F 21/602 |
| 2020/0285722 A1* | 9/2020 | He | G06F 21/32 |
| 2020/0393929 A1* | 12/2020 | Kim | G06F 3/0416 |
| 2021/0192027 A1* | 6/2021 | Malton | G06F 21/32 |
| 2021/0326024 A1* | 10/2021 | Jun | G06F 3/04184 |
| 2021/0349572 A1* | 11/2021 | Kim | G06F 3/04164 |
| 2021/0357488 A1* | 11/2021 | Huang | G06V 40/1365 |

FOREIGN PATENT DOCUMENTS

| | | | | |
|---|---|---|---|---|
| CN | 104205721 | 12/2014 | | |
| CN | 104850821 | 8/2015 | | |
| CN | 104933351 | 9/2015 | | |
| CN | 104951159 | 9/2015 | | |
| CN | 105117698 | 12/2015 | | |
| CN | 105224139 | 1/2016 | | |
| CN | 105229596 | 1/2016 | | |
| CN | 105447484 | 3/2016 | | |
| CN | 105912901 | 8/2016 | | |
| CN | 106446871 | 2/2017 | | |
| CN | 106487754 | 3/2017 | | |
| CN | 106529383 | 3/2017 | | |
| JP | 2007-524906 | 8/2007 | | |
| JP | 2010-128600 | 6/2010 | | |
| KR | 10-2005-0092171 | 9/2005 | | |
| KR | 10-0583463 | 5/2006 | | |
| KR | 10-2015-0029254 | 3/2015 | | |
| KR | 10 2015 0029254 | 3/2015 | * | G06F 21/32 |
| KR | 10-2016-0071887 | 6/2016 | | |
| KR | 10-2016-0136013 | 11/2016 | | |
| KR | 10-2017-0049280 | 5/2017 | | |

OTHER PUBLICATIONS

SIPO, Office Action of CN 201880039891.8 dated Aug. 30, 2021.
SIPO, Search Report of CN 201880039891.8 dated Jul. 22, 2020.
KIPO, A PCT Search Report & Written Opinion, dated Sep. 11, 2018.

* cited by examiner

TERMINAL AND CONTROL METHOD THEREOF

CROSS-REFERENCE TO RELATED APPLICATION

This application claims priority to and benefits of Korean Patent Application No. 10-2017-0073104 filed in the Korean Intellectual Property Office on Jun. 12, 2017, the entire contents of which are incorporated herein by reference.

BACKGROUND OF THE INVENTION

(a) Field of the Invention

The present disclosure relates to a terminal for recognizing a fingerprint, and a control method thereof.

(b) Description of the Related Art

Recently, with the development of various terminals and wearable devices, various functions for utilizing personal information such as finance and security have been provided, and the importance of security verification is increasing.

Biometric verification technology uses a fingerprint, iris, voice, face, blood vessels, etc. to verify a user. The biometrics used for verification vary from person to person, are free from discomfort, have less risk of theft or imitation, and do not change well over a lifetime.

In particular, a fingerprint verification method is increasingly commercially available for various reasons such as convenience, security, and economics. A sensing unit used in the fingerprint verification method may directly or indirectly contact a user's finger to obtain a fingerprint image of the finger, and obtain a fingerprint pattern from the fingerprint image.

As terminals equipped with such a fingerprint verification function are spreading, research for improving usability of the terminals is required.

SUMMARY OF THE INVENTION

Exemplary embodiments have been made in an effort to provide a terminal and a method of controlling the terminal capable of performing fingerprint verification depending on different security levels.

The exemplary embodiments have been made in an effort to provide a terminal and a method of controlling the terminal capable of performing fingerprint verification with a low resolution fingerprint sensor.

For achieving the objects or other objects, an aspect of the present invention provides a fingerprint recognition sensor for acquiring a fingerprint image and a controller for checking a security request level of a fingerprint verification request when the fingerprint verification request is received, determining a verification level depending on the security request level, and performing fingerprint verification in a manner corresponding to the verification level using the fingerprint image.

The controller may control the fingerprint recognition sensor to acquire a fingerprint image of a first level when the security request level is less than or equal to the security request level of a previous verification request that has been completed before the fingerprint verification request, and an elapsed time from the previous verification request is within a threshold time, and the fingerprint image of the first level may include any one of a low resolution fingerprint image, a small area fingerprint image, and a small area low resolution fingerprint image.

The fingerprint recognition sensor may include a touch driver configured to include a plurality of Tx channels extending in a first direction and arranged in a second direction crossing the first direction, a plurality of Rx channels extending in the second direction and arranged in the first direction, and a touch driver for receiving a sensing signal from at least one of the Rx channels, and the touch driver may supply a driving signal to a Tx channel selected among the Tx channels to acquire the fingerprint image of the first level under control of the controller.

The fingerprint recognition sensor may include a plurality of touch electrodes arranged in a matrix form, and a touch driver for supplying a driving signal to at least one of the touch electrodes, and receiving a sensing signal from at least one of the touch electrodes, and the touch driver may supply a driving signal to a touch electrode selected among the touch electrodes to acquire the fingerprint image of the first level under control of the controller.

The controller may acquire some types of feature information from types of feature information that are obtainable from the fingerprint image when the security request level is less than or equal to the security request level of a previous verification request that has been completed before the fingerprint verification request, and an elapsed time from the previous verification request is within a threshold time.

The obtainable types of characteristic information may include a bifurcation point, an end point, a core, a delta, a vector of ridges, and a vector of valleys.

The controller may determine that the fingerprint is verified when a first accuracy is satisfied in the case where the security request level is less than or equal to the security request level of a previous verification request that has been completed before the fingerprint verification request, and an elapsed time from the previous verification request is within a threshold time, or determine that the fingerprint is verified when a second accuracy that is higher than the first accuracy is satisfied in the case where the security request level exceeds the security request level of the previous verification request, or the elapsed time exceeds the threshold time while the security request level is less than or equal to the security request level of the previous verification request.

Each of the first accuracy and the second accuracy may include a false acceptance rate (FAR), a false rejection rate (FRR), or a value based on the FAR or FRR.

The terminal may further include a touch sensor configured to detect a touch input and a pressure sensor configured to sense a touch pressure, and the controller may determine that the fingerprint verification request is received by using the touch input and the touch pressure.

The terminal may further include a display unit, and a touch sensor configured to detect a touch input, and the controller may determine that a touch pressure with intensity that exceeds a threshold value is applied when an area of the touch input exceeds a predetermined area, and may determine that the fingerprint verification request is received by using the touch input and the touch pressure.

The controller may detect an object displayed on an area of the display unit corresponding to the touch input when the touch input is detected, and may determine that the fingerprint verification request is received when the intensity of the touch pressure exceeds the threshold value in the case where a process corresponding to the object requests fingerprint verification.

The controller may perform at least one of operations of: acquiring a low-resolution fingerprint image, acquiring characteristic information of some types among types of characteristic information that are obtainable from the fingerprint image; and determining that the fingerprint is verified when a first accuracy is satisfied when the touch input is detected, the intensity of the touch pressure exceeds a threshold value, and an elapsed time from a previous unlock is within a threshold time in the case where the terminal is locked.

Another aspect of the present invention provides a control method of a terminal, including: receiving a fingerprint verification request; checking a security request level of the fingerprint verification request, and determining a verification level depending on the security request level; and performing fingerprint verification in a manner corresponding to the verification level by using a fingerprint image acquired by a fingerprint recognition sensor.

The determining of the verification level may include: determining whether the security request level is less than or equal to the security request level of a previous verification request that has been completed before the fingerprint verification request; and determining whether an elapsed time from the previous verification request is within a threshold time.

The performing of the fingerprint verification may include controlling the fingerprint recognition sensor to acquire a fingerprint image of a first level when the security request level is less than or equal to the security request level of a previous verification request that has been completed before the fingerprint verification request, and the elapsed time is within the threshold time, and the fingerprint image of the first level may include any one of a low resolution fingerprint image, a small area fingerprint image, and a small area low resolution fingerprint image.

The controlling of the fingerprint recognition sensor may include supplying a driving signal to a Tx channel selected among a plurality of Tx channels to acquire the fingerprint image of the first level when the fingerprint recognition sensor includes the plurality of Tx channels extending in a first direction and arranged in a second direction crossing the first direction, and a plurality of Rx channels extending in the second direction and arranged in the first direction.

The controlling of the fingerprint recognition sensor may include supplying a driving signal to a touch electrode selected among a plurality of touch electrodes to acquire the fingerprint image of the first level when the fingerprint recognition sensor includes the plurality of touch electrodes.

The performing the fingerprint verification may include acquiring some types of feature information from types of feature information that is obtainable from the fingerprint image when the security request level is less than or equal to the security request level of a previous verification request that has been completed before the fingerprint verification request, and the elapsed time is within the threshold time, and the obtainable types of characteristic information may include a bifurcation point, an end point, a core, a delta, a vector of ridges, and a vector of valleys.

The performing of the fingerprint verification may include determining that the fingerprint is verified when a first accuracy is satisfied in the case where the security request level is less than or equal to the security request level of a previous verification request that has been completed before the fingerprint verification request, and the elapsed time is within the threshold time, or determining that the fingerprint is verified when a second accuracy that is higher than the first accuracy is satisfied in the case where the security request level exceeds the security request level of the previous verification request, or the elapsed time exceeds the threshold time while the security request level is less than or equal to the security request level of the previous verification request.

Each of the first accuracy and the second accuracy may include a false acceptance rate (FAR), a false rejection rate (FRR), or a value based on the FAR or FRR.

The receiving of the fingerprint verification request may include: detecting a touch input; detecting an object displayed in an area of the display unit corresponding to the touch input and determining that the fingerprint verification request is received when the intensity of the touch pressure exceeds the threshold value in the case where a process corresponding to the object requests fingerprint verification.

The receiving of the fingerprint verification request may include: detecting a touch input; detecting an object displayed in an area of the display unit corresponding to the touch input and determining that the fingerprint verification request is received when the area of the touch input exceeds the threshold value in the case where a process corresponding to the object requests fingerprint verification.

The effects of the terminal and the control method thereof according to the present disclosure will be described as follows.

According to at least one of the exemplary embodiments of the present disclosure, the fingerprint verification may be quickly performed.

In addition, according to at least one of the embodiments of the present disclosure, a fingerprint recognition rate may be improved.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention such as an exemplary embodiment of the present invention are provided only by way of example.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

In addition, unless explicitly described to the contrary, the word "comprise" and variations such as "comprises" or "comprising" will be understood to imply the inclusion of stated elements but not the exclusion of any other elements.

Exemplary embodiments to be described below may be used to recognize a user's fingerprint. Hereinafter, an operation of recognizing the fingerprint of the user may include an operation of verifying or identifying the user by recognizing the fingerprint of the user. The verifying operation may include an operation of determining whether the user is one of a plurality of registered users. In this case, a result of the operation of verifying the user may be outputted as true or false. The operation identifying the user may include determining which user the user corresponds to among the registered users. In this case, the result of the operation of identifying the user may be output as an ID of any one registered user. When the user does not correspond to any of the registered users, a signal may be outputted indicating that the user is not identified.

Exemplary embodiments may be implemented by using various types of terminals such as mobile phones, smart phones, laptop computers, digital broadcasting terminals, personal digital assistants, portable multimedia players, navigation units, slate PCs, tablet PCs, ultrabooks, and wear devices (e.g., smartwatches, smart glasses, head mounted displays, and the like).

However, it will be apparent to a person of ordinary skill in the art that a configuration according to an exemplary embodiment may also be applied to fixed terminals such as desktop computers, laptop computers, digital TVs, smart home appliances, intelligent vehicles, kiosks, and the like.

For example, exemplary embodiments may be used to verify users in smart phones, mobile devices, smart home systems, and the like. Exemplary embodiments may be used in payment services through user verification. In addition, exemplary embodiments may be applied to an intelligent automobile system or the like that automatically starts a vehicle by verifying a corresponding user. Hereinafter, the exemplary embodiments will be described in detail with reference to the accompanying drawings.

Figure 1:
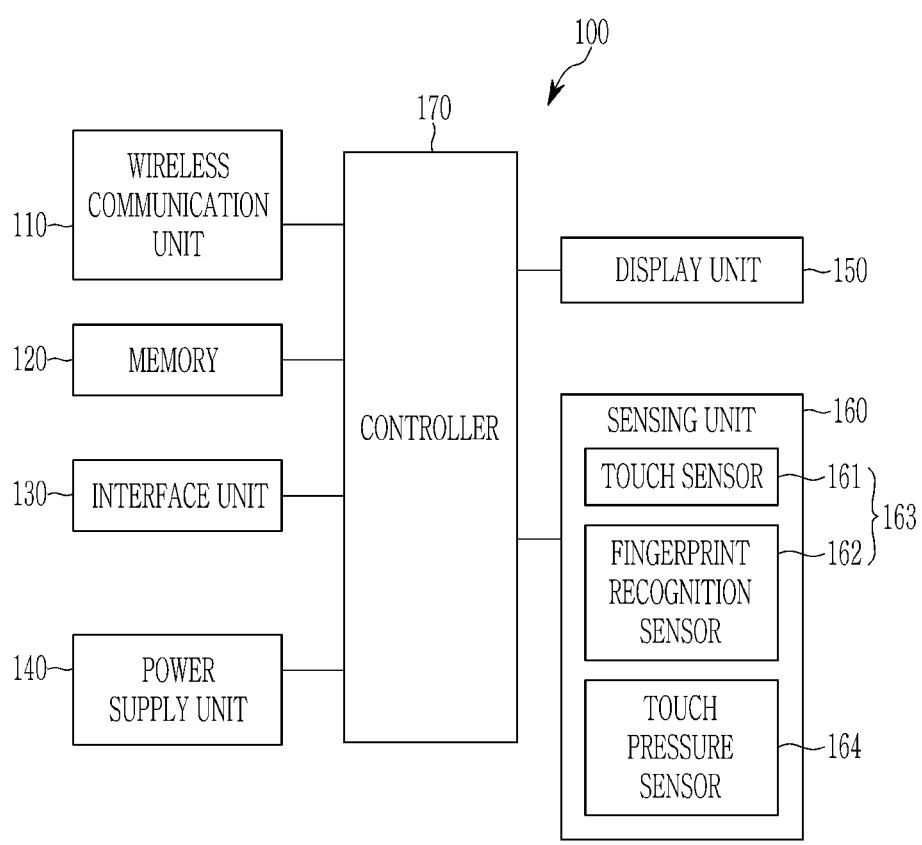
FIG. 1 illustrates a block diagram of a terminal according to an exemplary embodiment.

FIG. 1 illustrates a block diagram of a terminal 100 according to an exemplary embodiment.

The terminal 100 may include a wireless communication unit 110, a memory 120, an interface unit 130, a power supply unit 140, a display unit 150, a sensing unit 160, and a controller 170. The constituent elements illustrated in FIG. 1 are not essential for implementing the terminal, so the terminal described in the present disclosure may include more or less constituent elements than the foregoing listed constituent elements.

Specifically, among the constituent elements, the wireless communication unit 110 may include at least one module that enables wireless communication between the terminal 100 and a wireless communication system, between the terminal 100 and another terminal 100, or between the terminal 100 and an external server. In addition, the wireless communication unit 110 may include at least one module for connecting the terminal 100 to at least one network.

Further, the memory 120 stores data supporting various functions of the terminal 100. The memory 120 may store a plurality of application programs (or applications), data for operating the terminal 100, and commands, which are driven in the terminal 100.

The interface unit 130 serves as a passage of various kinds of external devices connected with the terminal 100. The interface unit 130 may include at least one of a wired/wireless headset port, an external charger port, a wired/wireless data port, a memory card port, a port for connection with a device equipped with an identification module, an audio input/output (I/O) port, a video input/output (I/O) port, and an earphone port.

The power supply unit 140 receives power from an external power source and an internal power source, and supplies the power from the power source to each constituent element included in the terminal 100 under the control of the controller 170. The power supply unit 140 includes a battery, and the battery may be an embedded battery or a replaceable battery.

The display unit 150 displays (outputs) information processed by the terminal 100. For example, the display unit 150 may display execution image information of an application program driven in the terminal 100, or user interface (UI) and graphical user interface (GUI) information according to the execution image information.

The display unit 150 may include a liquid crystal display (LCD), an organic light emitting diode (OLED) display, an e-ink display, and the like. The display unit 150 may form a layer structure with the sensing unit 160, or may be integrally formed therewith.

The sensing unit 160 includes a touch sensor 161, a fingerprint recognition sensor 162, and a touch pressure sensor 164.

The touch sensor 161 senses a touch (or touch input) applied to a touch area by using at least one of various touch methods such as a resistive type, a capacitive type, an infrared type, an ultrasonic wave type, and a magnetic field type.

As an example, the touch sensor 161 may be configured to convert a change in capacitance, voltage, current, or the like, which are generated in a specific portion, into an electrical input signal. The touch sensor 161 may be configured to detect a position, an area, a capacitance at the touch, and the like, when a touch object that applies a touch onto a touch area is touched on the touch sensor 161. Herein, the touch object is an object applying a touch to the touch sensor, and may be, e.g., a finger, a touch pen or a stylus pen, a pointer, or the like.

The fingerprint recognition sensor 162 may capture an image of a fingerprint of a user's finger (or a toe in some cases). The fingerprint recognition sensor 162 may acquire a fingerprint image by a capacitive method, an optical method, a thermal sensing method, an ultrasonic method, or the like.

Meanwhile, when both the touch sensor 161 and the fingerprint recognition sensor 162 operate in a capacitive manner, the touch sensor 161 and the fingerprint recognition sensor 162 may be integrally formed, and in the following description, it is assumed that the touch sensor 161 and the fingerprint recognition sensor 162 are integrally formed as a touch sensor panel.

The touch pressure sensor 164 senses a pressure applied to a specific portion of the touch area. The touch pressure sensor 164 may be configured to detect a position, a pressure at the touch, and the like, when a touch object that applies a touch onto a touch area is touched on the touch sensor.

The touch sensor 161 may also detect the touch pressure by using an area where the touch object is touched on the touch sensor 161. Therefore, even when the touch pressure sensor 164 is not provided separately, the touch pressure may be detected using the touch sensor 161. In addition, when the touch pressure sensor 164 is provided, the touch pressure may be detected in consideration of both the area of the touch input detected using the touch sensor 161 and the pressure at the touch detected by the touch pressure sensor 164.

The controller 170 generally controls a general operation of the terminal 100 in addition to the operation related to the application program. The controller 170 processes the input or output signal, data, information, and the like, or drives the application program stored in the memory 170 through the foregoing constituent elements, thereby providing the user with or processing the appropriate information or function.

Further, the controller 170 may control at least a part of the constituent elements described with reference to FIG. 1 in order to drive the application program stored in the memory 170. In addition, the controller 170 may combine two or more of the constituent elements included in the terminal 100 and operate the combined constituent elements for driving the application program.

At least some of the constituent elements may cooperate with each other and be operated for operating, controlling, or implementing a method for controlling the terminal 100 according to various exemplary embodiments described below. Further, the operation, the control, or the method for controlling the terminal 100 may be implemented in the terminal 100 through driving of at least one application program stored in the memory 170.

Next, the display unit 150 and the sensing unit 160 will be described in detail with reference to FIG. 2 to FIG. 4.

Figure 2:
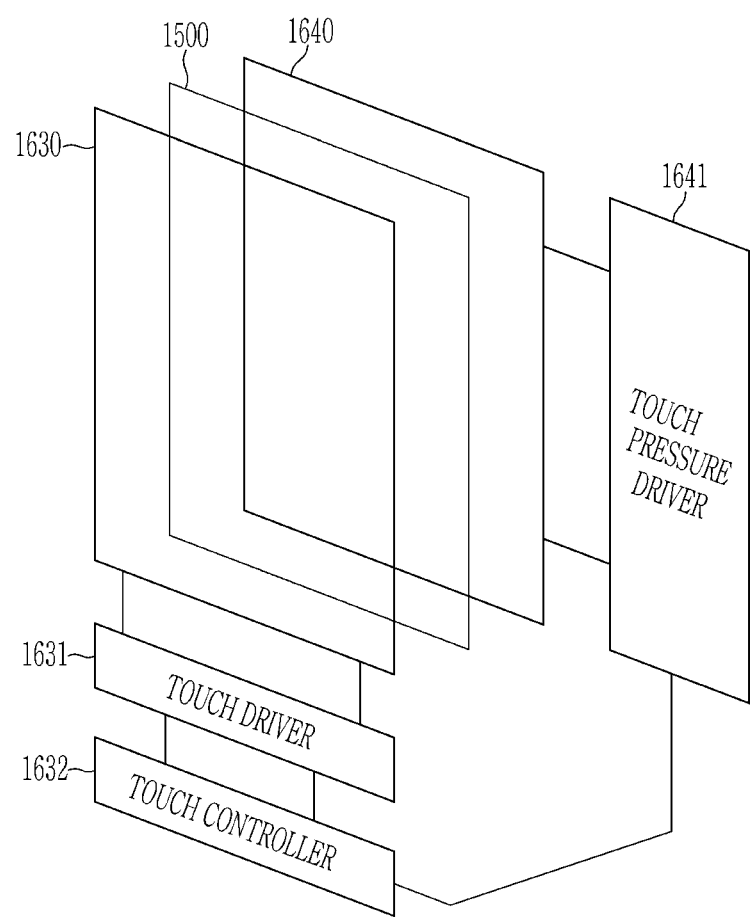
FIG. 2 is a schematic diagram illustrating a sensing unit of a terminal according to an exemplary embodiment.

First, FIG. 2 illustrating a schematic diagram showing some constituent elements of the terminal 100 according to an exemplary embodiment. As illustrated, the touch sensor 161 and the fingerprint recognition sensor 162 may be formed as a touch sensor panel 1630.

The touch sensor panel 1630 may include a plurality of touch electrodes (not illustrated). A touch driver 1631 may apply a driving signal to the touch electrodes, and may receive a sensing signal corresponding to the changed capacitance from the touch electrodes.

A display panel 1500 may be disposed below the touch sensor panel 1630. In FIG. 2, the touch sensor panel 1630 and the display panel 1500 are illustrated to be separated from each other, but the touch sensor panel 1630 and the display panel 1500 may be integrally formed. For example, the touch sensor panel 1630 may be disposed on a substrate of the display panel 1500, or may be provided inside the display panel 1500.

The display panel 1500 may include a plurality of pixels (not illustrated). The pixels represent corresponding luminance depending on an image signal. The pixels may include a liquid crystal display element or an organic light emitting diode.

A touch pressure sensor panel 1640 may be disposed below the display panel 1500. The touch pressure sensor panel 1640 may include at least one electrode (not illustrated) and a reference potential layer (not illustrated).

A touch pressure driver 1641 may apply a driving signal to at least one electrode, and may receive an electrical signal depending on a change in capacitance between the electrode to which the driving signal is applied and the reference potential layer. The touch pressure driver 1641 may generate a driving signal in a pulse form to apply the driving signal to the electrodes.

Specifically, capacitance between the electrode and the reference potential layer may change depending on a distance change between the electrode and the reference potential layer, and the touch pressure driver 1641 may output information related to the change in capacitance. In addition, since the touch pressure driver 1641 may also receive electrical signals depending on a change in distance between each electrode and the reference potential layer, the touch pressure driver 1641 may also output information related to a position where pressure is applied.

As such, when there is a touch input to the touch sensor panel 1630 or a pressure input to the touch pressure sensor panel 1640, sensing signal(s) corresponding thereto are transferred to a touch controller 1632.

The touch controller 1632 may be connected to the touch driver 1631 and the touch pressure driver 1641 through an interface such as an I2C bus, a serial peripheral interface (SPI), a system bus, and the like. Alternatively, the touch driver 1631, the touch pressure driver 1641, and the touch controller 1632 may be configured as one integrated circuit (IC).

The touch controller 1632 may process the signal(s), and then transmit corresponding data to the controller 170. As a result, the controller 170 may determine which portion of the touch area is touched and with how much pressure it is touched. Pressure magnitude may be detected. In addition, the controller 170 may detect which portion of the touch area the pressure is applied to.

Herein, the touch controller 1632 may be a constituent element that is separated from the controller 170, and may be the controller 170 itself.

Figure 3:
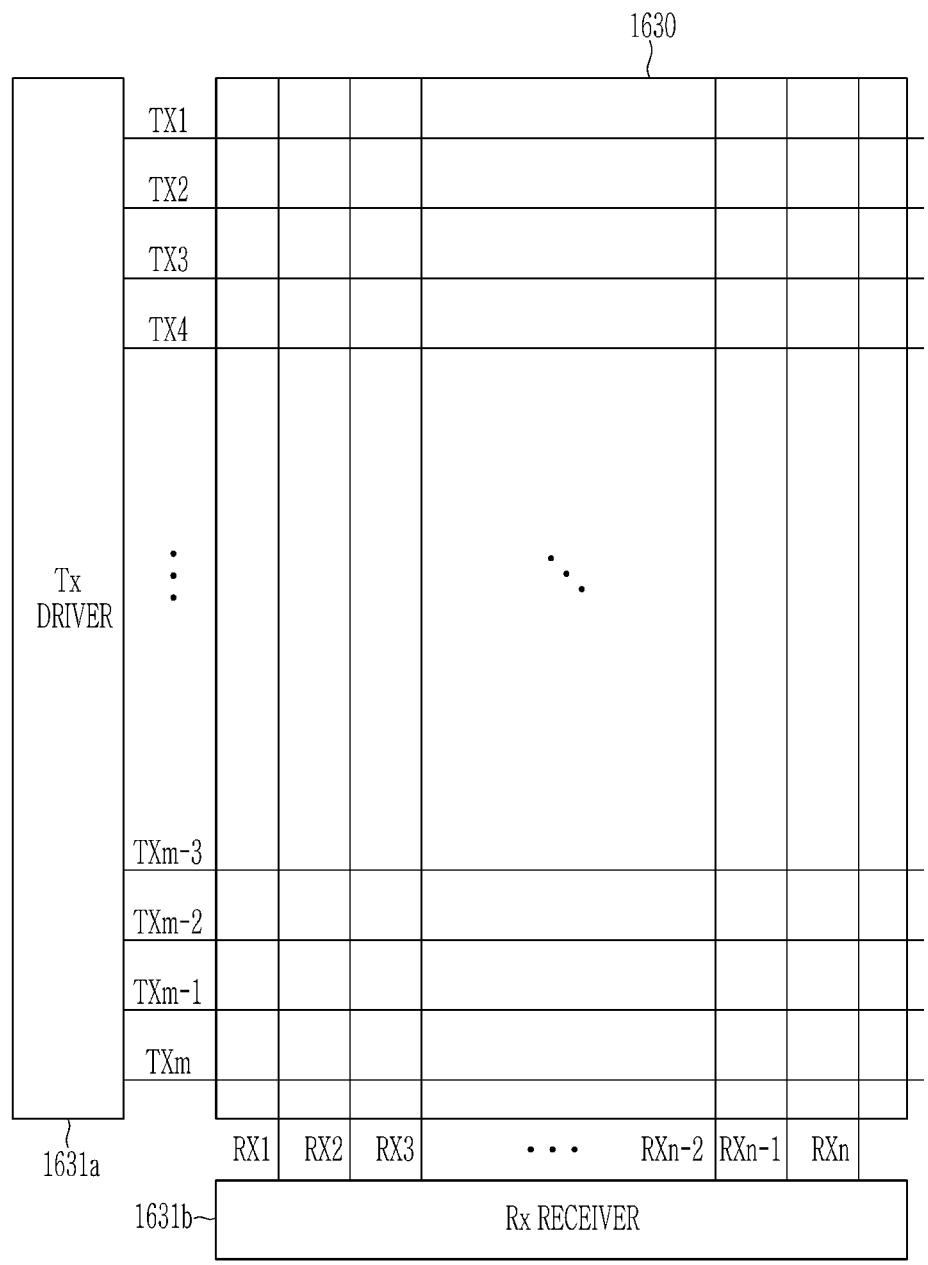
FIG. 3 and FIG. 4 illustrate schematic diagrams showing some constituent elements of a touch sensor panel according to various aspects of the exemplary embodiment.

FIG. 3 illustrates a schematic diagram showing some constituent elements of a touch sensor panel according to one aspect of the exemplary embodiment. As illustrated in FIG. 3, the touch sensor panel 1630 includes Tx electrode lines (or Tx channels) TX1 to TXm (where m is a positive integer) that extend along a first direction and are arranged in a second direction crossing the first direction, and Rx electrode lines (or Rx channels) RX1 to RXn (where n is a positive integer) that extend along the second direction and are arranged in the first direction. The adjacent Tx and Rx electrode lines in close proximity to each other form a mutual sensing capacitor that functions as a touch sensing sensor. The mutual sensing capacitor may receive a driving signal through the Tx electrode line, and may output a change in capacitance caused by contact of an external object as a sensing signal through the Rx electrode line.

The touch driver 1631 includes a Tx driver 1631*a* and an Rx receiver 1631*b*. The touch driver 1631 supplies a driving signal to the Tx channels TX1 to TXm, senses an amount of charge of the mutual sensing capacitor through the Rx channels RX to RXn, and converts the charge amount into digital data.

The Tx driver 1631*a* may supply a driving signal to at least one Tx channel selected by the touch controller 1632 among the Tx channels TX1 to TXm. The driving signal may be supplied in a multi-pulse form to improve sensing sensitivity.

The Rx receiver 1631*b* may receive a sensing signal from at least one Rx channel selected by the touch controller 1632 among the Rx channels RX to RXn. The Rx receiver 1631*b* converts the inputted sensing signal into digital sensing data and transmits it to the touch controller 1632.

Figure 4:
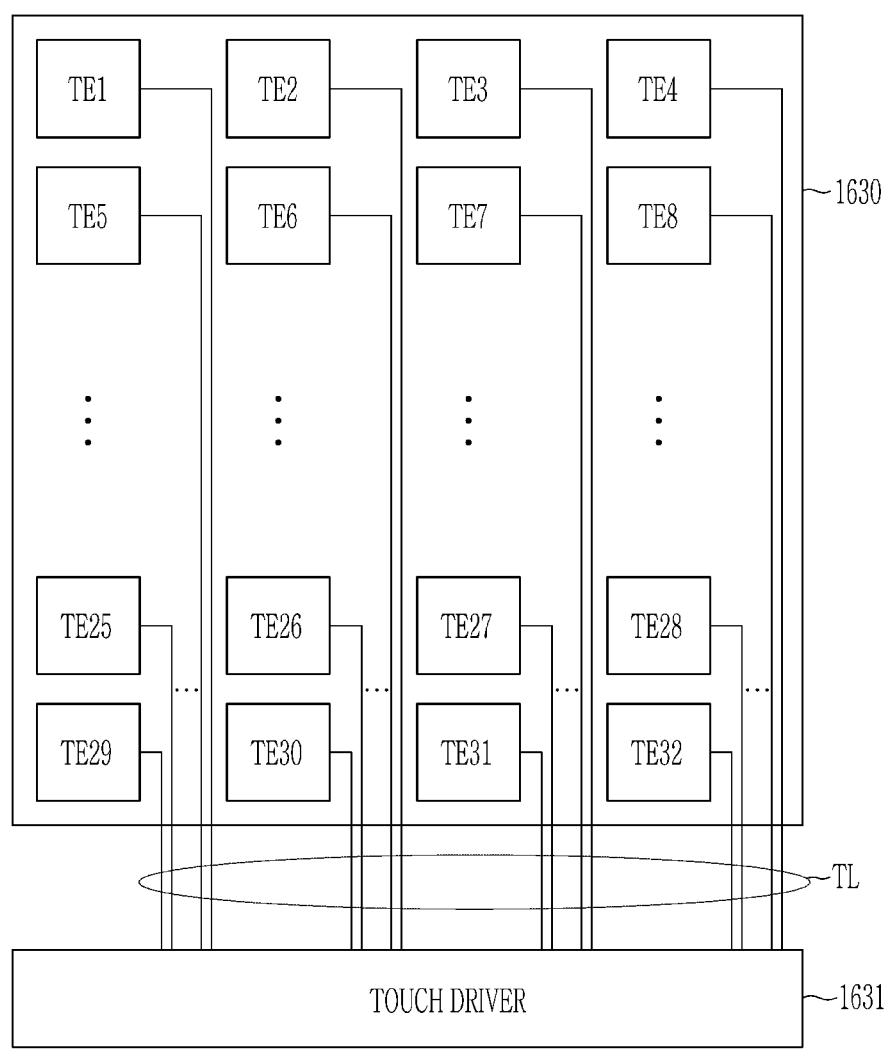

FIG. 4 illustrates a schematic diagram showing some constituent elements of a touch sensor panel according to another aspect of the exemplary embodiment. As illustrated in FIG. 4, the touch sensor panel 1630 may include a plurality of touch electrodes TE1 to TE32 arranged in a matrix form.

The touch electrodes TE1 to TE32 may be connected to a touch driver 1631*c* through a plurality of touch lines TL. The touch lines TL may transfer a driving signal from the touch driver 1631*c* to each of the touch electrodes TE1 to TE32, or may transfer a sensing signal from each of the touch electrodes TE1 to TE32 to the touch driver 1631*c*.

Each of the touch electrodes TE1 to TE32 may form a self-sensing capacitor with an external object. Specifically, the touch electrode receives a driving signal, to be charged with a predetermined charge amount. When an external object such as a finger touches or approaches the touch area, a change in capacitance of the self-sensing capacitor may be transferred to the touch driver 1631*c* through the touch lines TL as a sensing signal. Then, the touch driver 1631 senses a change amount of the self-sensing capacitor, and converts it into digital data.

In FIG. 4, 32 touch electrodes TE1 to TE32 are illustrated, but the number, shape, arrangement, and the like of the touch electrodes are not limited thereto.

Hereinafter, a control method implementable by the terminal 100 formed as described above and relevant exemplary embodiments will be described with reference to the accompanying drawings.

Figure 5:
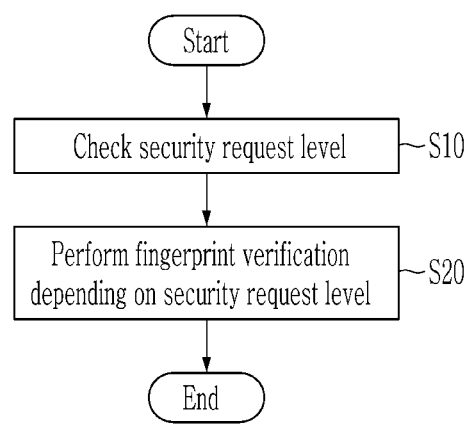
FIG. 5 illustrates a flowchart showing a fingerprint verification method of a terminal according to an exemplary embodiment.

FIG. 5 illustrates a flowchart showing a fingerprint verification method of the terminal 100 according to an exemplary embodiment. First, the controller 170 checks a security request level (510). When fingerprint verification is requested, the controller 170 may check the security request level of the fingerprint verification.

The fingerprint verification may be requested in a process of a currently running application, a process of the application to be executed by user's selection, an unlocking process, or the like.

For example, when an online banking application is running, fingerprint verification for user verification may be requested in an account inquiry process, an account transfer process, a user login process, or the like. Then, the controller 170 may check the security request level of the requested fingerprint verification.

The security request level may be divided into a plurality of levels. For example, the security request level is divided into two levels, i.e., a first security request level and a second security request level. In this case, the first security request level is a level requesting a fingerprint verification method with relatively low accuracy, and the second security request level is a level requesting a fingerprint verification method with higher accuracy than the first security request level.

Then, the controller 170 performs the fingerprint verification depending on the security request level (S20). The controller 170 may perform fingerprint verification in a different manner depending on the security request level of the requested fingerprint verification.

When the security request level is high, the controller 170 performs the fingerprint verification in a manner corresponding to the first verification level. Alternatively, when the security request level is low, the controller 170 performs the fingerprint verification in a manner corresponding to the second verification level.

Hereinafter, the fingerprint verification step S20 depending on the security request level of the controller 170 will be described with reference to FIG. 6 to FIG. 8.

Figure 6:
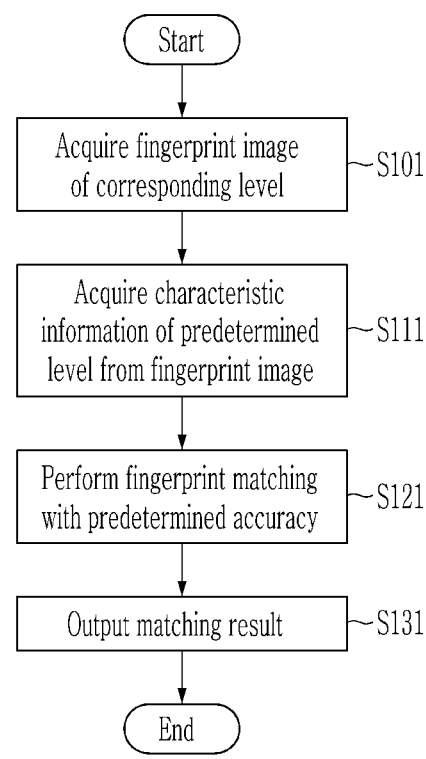
FIG. 6 to FIG. 8 illustrate flowcharts showing various aspects of a fingerprint verification method according to an exemplary embodiment.
Figure 7:
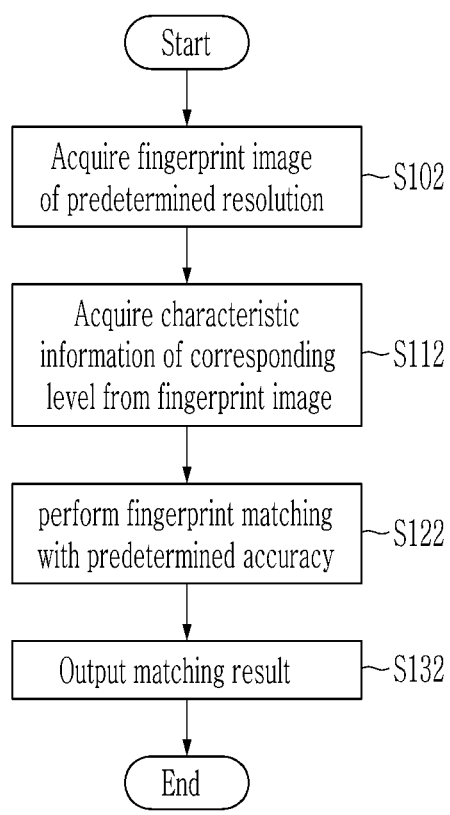
Figure 8:
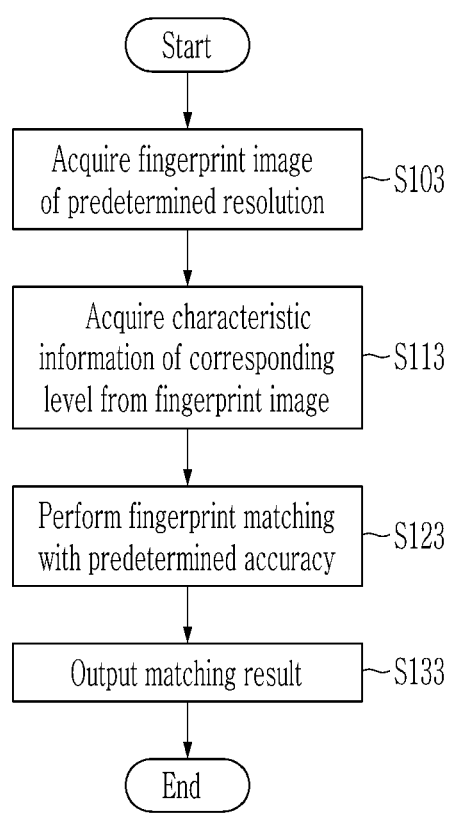

FIG. 6 to FIG. 8 illustrate flowcharts illustrating various aspects of a fingerprint verification method according to an exemplary embodiment.

First, as illustrated in FIG. 6, the controller 170 acquires a fingerprint image having a resolution corresponding to a verification level (S101). Specifically, the controller 170 may acquire a high resolution or low resolution fingerprint image depending on the verification level.

For example, when the fingerprint verification of a high security request level is requested, the controller 170 outputs a first mode selection signal corresponding to the first verification level to the touch controller 170. As another example, when the fingerprint verification of a low security request level is requested, the controller 170 outputs a second mode selection signal corresponding to the second verification level to the touch controller 170. The touch controller 170 controls the touch driver depending on the selection signal inputted from the controller 170.

The controller 170 may acquire the high resolution fingerprint image by outputting the first mode selection signal. Alternatively, the controller 170 may acquire the low resolution fingerprint image by outputting the second mode selection signal.

The controller 170 may acquire a fingerprint image of a first area by outputting the first mode selection signal. Alternatively, the controller 170 may acquire a fingerprint image of a second area that is smaller than the first area by outputting the second mode selection signal.

In addition, the controller 170 may obtain the high resolution fingerprint image of the first area by outputting the first mode selection signal, or may obtain the low resolution fingerprint image of the second area by outputting the second mode selection signal.

First, a method in which the controller 170 acquires a fingerprint image having a different resolution depending on the selection signal will be described.

In the case of the touch sensor panel 1630 illustrated in FIG. 3, the Tx driver 1631*a* may supply a driving signal to at least one Tx channel selected by the selection signal among the Tx channels TX1 to TX*m*. Alternatively, the Rx receiver 1631*b* may receive a sensing signal from at least one Rx channel selected by the selection signal among the Rx channels RX to RX*n*. This will be described with reference to FIG. 9 and FIG. 10.

Figure 9:
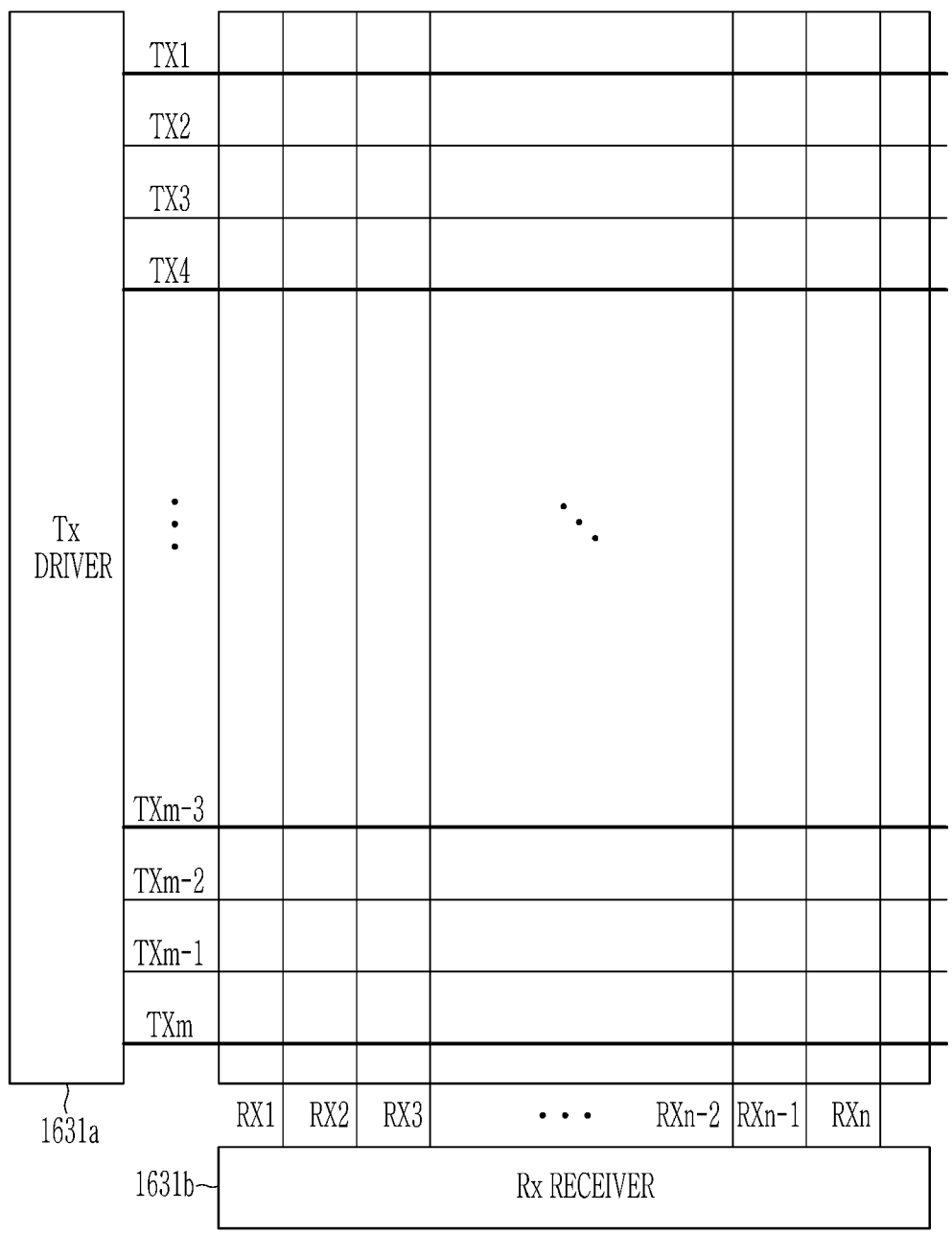
FIG. 9 and FIG. 10 illustrate schematic diagrams showing different operation modes of a sensing unit.
Figure 10:
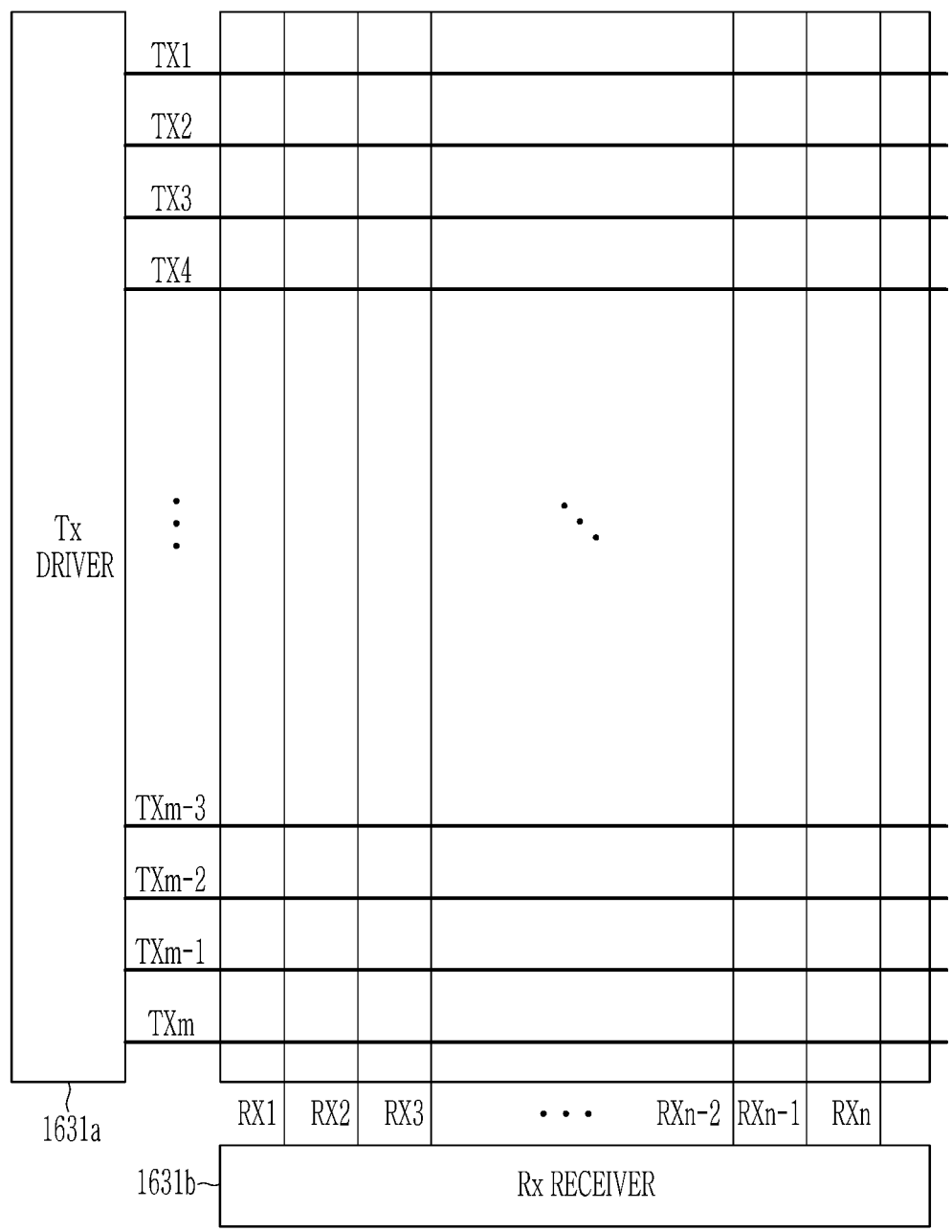

FIG. 9 and FIG. 10 illustrate schematic diagrams showing different operation modes of the sensing unit 160 illustrated in FIG. 3.

First, the Tx driver 1631*a* illustrated in FIG. 9 operates depending on the first mode selection signal. The Tx driver 1631*a* may apply a driving signal to each Tx channel. That is, when the first mode selection signal is inputted, the Tx driver 1631*a* applies a driving signal to the Tx channels TX1 to TX*m* in a relatively high density.

In FIG. 9, it is illustrated that a driving signal is applied to all the Tx channels TX1 to Tx*m* in the touch, but the Tx driver 1631*a* may apply a driving signal only to all the Tx channels (e.g., TX1 to TX4) in a region of the touch area, and the regions may be regions spaced apart from each other along the second direction.

Next, the Tx driver 1631*a* illustrated in FIG. 10 operates depending on the second mode selection signal. The Tx driver 1631*a* may apply a driving signal to every three Tx channels. That is, when the second mode selection signal is inputted, the Tx driver 1631*a* applies the driving signal to the Tx channels TX1, TX4, TXm−3, and TXm in a relatively low density.

In FIG. 10, it is illustrated that a driving signal is applied to every three Tx channels among the Tx channels TX1 to TXm positioned in the touch area, but the Tx driver 1631*a* may apply the driving signal to every three Tx channels TX1 and TX4 among the Tx channels (e.g., TX1 to TX4) in a region of the touch area, and the regions may be regions spaced apart from each other along the second direction.

In the first mode, the Tx driver 1631*a* obtains a high resolution fingerprint image by applying a driving signal to all Tx channels TX1 to TXm. In contrast, in the second mode, the Tx driver 1631*a* obtains a low resolution fingerprint image by applying a driving signal to some Tx channels TX1, TX4, . . . , Txm−3, and TXm. Since the driving signal is applied only to some Tx channels TX1, TX4, . . . , TXm−3, and TXm in the second mode, a time required to acquire the fingerprint image in the second mode is shorter than a time required to acquire the fingerprint image in the first mode.

In the touch sensor panel 1630 illustrated in FIG. 4, the touch driver 1631*c* may supply a driving signal to at least one touch electrode selected by a selection signal among the touch electrodes TE1 to TE32. The touch driver 1631*c* may receive a sensing signal from at least one touch electrode selected by a selection signal among the touch electrodes TE1 to TE32. This will be described with reference to FIG. 11 and FIG. 12

Figure 11:
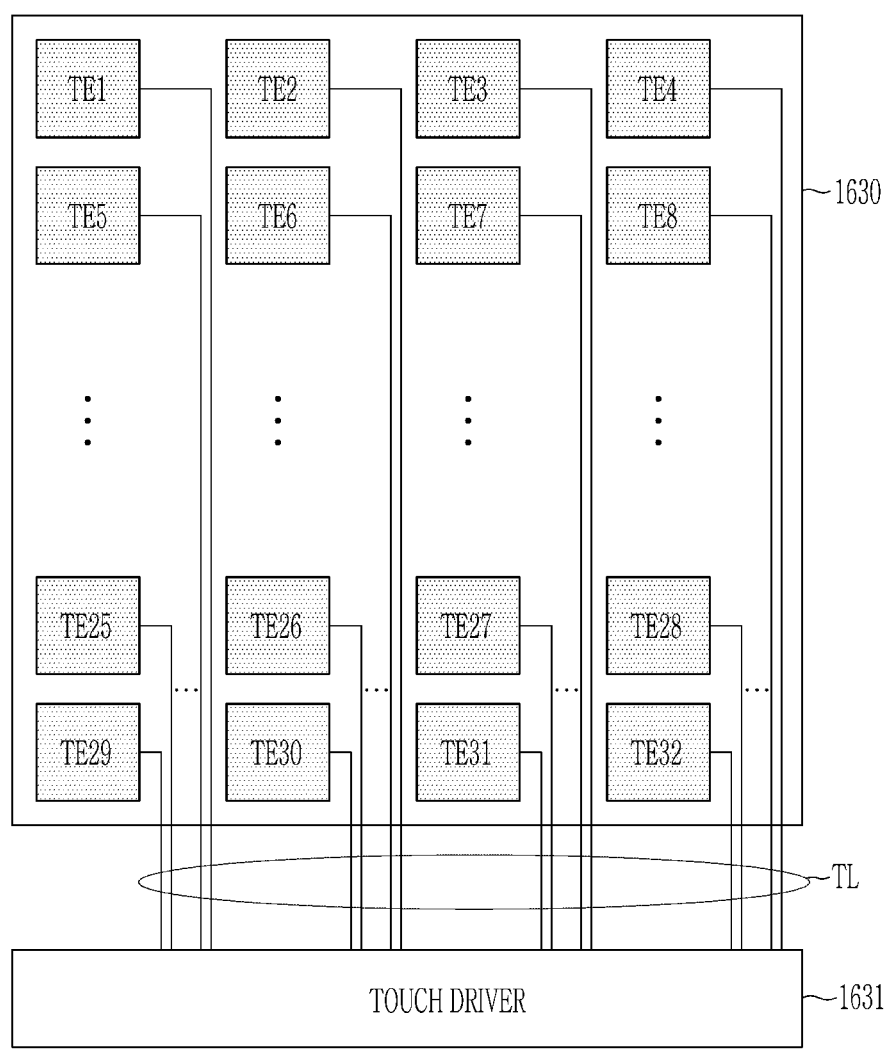
FIG. 11 and FIG. 12 illustrate schematic diagrams showing different operation modes of the sensing unit 160 illustrated in FIG. 4.
Figure 12:
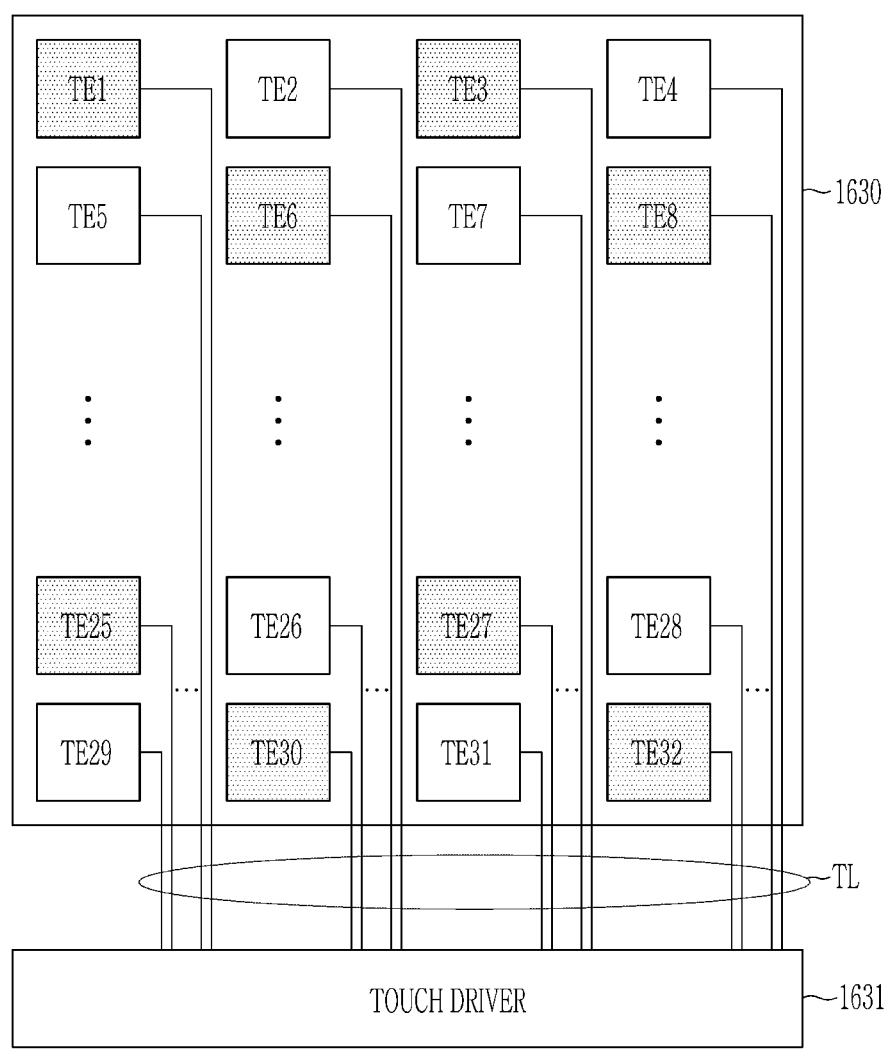

FIG. 11 and FIG. 12 illustrate schematic diagrams showing different operation modes of the sensing unit 160 illustrated in FIG. 4.

First, the touch driver 1631*c* illustrated in FIG. 11 operates depending on a first mode selection signal. The touch driver 1631*c* may apply a driving signal to all the touch electrodes TE1 to TE32. That is, when the first mode selection signal is inputted, the touch driver 1631*c* applies the driving signal to the touch electrodes TE1 to TE32 in a relatively high density.

Although FIG. 11 illustrates that the driving signal is applied to all the touch electrodes TE1 to TE32 in the touch area, the touch driver 1631*c* may apply a driving signal only to all touch electrodes (e.g., TE1, TE2, TE5, and TE6) in a region of the touch area, and the region may be one region corresponding to the touch electrodes adjacent to at least one direction.

Next, the touch driver 1631*c* illustrated in FIG. 12 operates depending on a second mode selection signal. The touch driver 1631*c* may apply a driving signal only to some touch electrodes TE1, TE3, TE6, TE8, TE25, TE27, TE30, and TE32. That is, when the first mode selection signal is inputted, the touch driver 1631*c* applies the driving signal to the touch electrodes in a relatively low density.

FIG. 12 illustrates that the driving signal is applied to the touch electrodes adjacent to each other only in a diagonal direction among the touch electrodes positioned in the touch area, where the touch driver 1631*c* applies a driving signal to the touch electrodes TE1 and TE6 adjacent to each other only in the diagonal direction among the touch electrodes (e.g., TE1, TE2, TE5, and TE6) positioned in a portion of the touch area, and the region may be one region corresponding to the touch electrodes adjacent to at least one direction.

In the first mode, the driving signal is applied to all the touch electrodes TE1 to TE32 to obtain a high resolution fingerprint image. In contrast, in the second mode, a low resolution fingerprint image is obtained by applying the driving signal to some touch electrodes TE1, TE3, TE6, TE8, . . . , TE25, TE27, TE30, and TE32. Since the driving signal is applied only to some Tx channels TE1, TE3, TE6, TE8, . . . , TE25, TE27, TE30, and TE32 in the second mode, a time required to acquire the fingerprint image in the second mode is shorter than a time required to acquire the fingerprint image in the first mode.

Next, a method in which the controller 170 acquires a fingerprint image having a different area depending on the selection signal will be described.

In the touch sensor panel 1630 illustrated in FIG. 3, the Tx driver 1631*a* may supply the driving signal to all the Tx channels TX1 to TXm by the first mode selection signal. Then, the controller 170 may acquire a fingerprint image corresponding to an area of the entire touch area.

The Tx driver 1631*a* may supply a driving signal to the Tx channels TX(m−3) to TXm corresponding to some regions of the touch area by the second mode selection signal. Then, the controller 170 may acquire a fingerprint image corresponding to some regions of the touch area.

In the touch sensor panel 1630 illustrated in FIG. 4, the touch driver 1631*c* may supply the driving signal to all the touch electrodes TE1 to TE32 by the first mode selection signal. Then, the controller 170 may acquire a fingerprint image corresponding to an area of the entire touch area.

The touch driver 1631*c* may supply the driving signal to the touch electrodes TE25 to TE32 corresponding to some regions of the touch area by the second mode selection signal. Then, the controller 170 may acquire a fingerprint image corresponding to some regions of the touch area.

In the above, the fingerprint image corresponding to the area of the entire touch area is described to be acquired by the first mode selection signal, but a fingerprint image corresponding to an area of some regions of the touch area may be acquired by the first mode selection signal, and in this case, the acquired fingerprint image may be larger than the area of the fingerprint image acquired by the second mode selection signal.

Referring back to FIG. 6, the controller 170 obtains characteristic information of a predetermined verification level from a fingerprint image (S111).

The feature information in the fingerprint image may include a minutiae representing at least one feature point. For example, the minutiae may include feature points such as bifurcation points, end points, cores, and deltas.

The feature information may also include information related to ridges and a direction (vector) or shape of valleys between the ridges.

The characteristic information of the predetermined verification level may be some types of characteristic information or all types of characteristic information. For example, the obtaining of the characteristic information of a predetermined verification level by the controller 170 may be that the controller 170 obtains only information on a branch point and the endpoint in the fingerprint image. Alternatively, the controller 170 may acquire the characteristic information of the predetermined verification level that may only be the information related to the direction of the ridges.

Next, the controller 170 performs fingerprint matching with predetermined accuracy (S121). The accuracy includes a false acceptance rate (FAR), a false rejection rate (FRR), or a value based on the FAR or FRR. The FAR is a ratio for determining a fingerprint match even when an input fingerprint and a registered fingerprint are different, and the FRR is a ratio for determining fingerprint mismatch even though the input fingerprint and the registered fingerprint are the same. In the present embodiment, the accuracy is described as a value represented by FAR.

In the case of the first verification level, high accuracy is required, and higher accuracy indicates a lower FAR (e.g., $\frac{1}{1,000,000}$). In the case of the second verification level, low accuracy is required, and lower accuracy indicates a higher FAR (e.g., $\frac{1}{1000}$).

The controller 170 may perform fingerprint matching using the feature information obtained in step S111 to satisfy the predetermined FAR. For example, the FAR may be predetermined as $\frac{1}{10,000}$.

Next, the controller 170 outputs a matching result (S131). A process requesting fingerprint verification may proceed with a corresponding operation according to the matching result.

Next, as illustrated in FIG. 7, the controller 170 acquires a fingerprint image having resolution corresponding to a predetermined verification level (S102). For example, the controller 170 may acquire the low resolution fingerprint image by outputting the second mode selection signal.

The controller 170 obtains feature information corresponding to the verification level from the fingerprint image (S112). For example, the feature information corresponding to the first level may include all types of feature information. The feature information corresponding to the second level may include some types of feature information.

When fingerprint verification of the high security request level is requested, the controller 170 acquires all types of feature information corresponding to the first verification level in the fingerprint image. Alternatively, when fingerprint verification of the low security request level is requested, the controller 170 acquires some types of feature information corresponding to the second verification level in the fingerprint image.

In the case of the first verification level, the controller 170 acquires all types of feature information. In contrast, in the case of the second verification level, the controller 170 obtains some types of characteristic information. That is, in the second verification level, a time required for the controller 170 to process the feature information in the fingerprint image is shorter than in the case of the first verification level.

The controller 170 matches fingerprints with predetermined accuracy (S122), and outputs a matching result (S132). The controller 170 may match feature information acquired from the acquired fingerprint image with feature information in the registered fingerprint image. In the case of the first verification level, matching should be performed on all acquired types of feature information, whereas in the case of the second verification level, matching should be performed on some acquired types of feature information, and thus a time required for fingerprint matching is shorter.

Next, as illustrated in FIG. 8, the controller 170 acquires a fingerprint image having resolution corresponding to a predetermined verification level (S103), and the controller 170 obtains feature information corresponding to the predetermined verification level from the fingerprint image (S113).

The controller 170 matches fingerprints with accuracy corresponding to the verification level (S122), and outputs a matching result (S132).

For example, when fingerprint verification with high security request level is requested, the controller 170 matches fingerprints with high accuracy corresponding to the first verification level. In addition, when fingerprint verification with a low security request level is requested, the controller 170 matches fingerprints with low accuracy corresponding to the second verification level.

In the case of the first verification level, the controller 170 outputs a matching result that the fingerprint matching is successful only when high accuracy is satisfied. In contrast, in the case of the second verification level, the controller 170 outputs a matching result that the fingerprint matching is successful when the low accuracy is satisfied. That is, in the case of the second verification level, a fingerprint verification success rate is higher than that of the first verification level. Thus, a shorter time is required to perform fingerprint verification.

According to the method described with reference to FIG. 6 to FIG. 8, the controller 170 may perform fingerprint verification at a corresponding verification level depending on the security request level of the fingerprint verification request. The controller 170 may use a combination of the steps of FIG. 6 to FIG. 8. For example, the controller 170 may perform steps S101, S112, and S123 depending on the security request level, or the controller 170 may perform steps S102, S113, and S121.

Next, a control method of the terminal 100 using a fingerprint verification method performed at different verification levels will be described with reference to FIG. 13 to FIG. 15.

Figure 13:
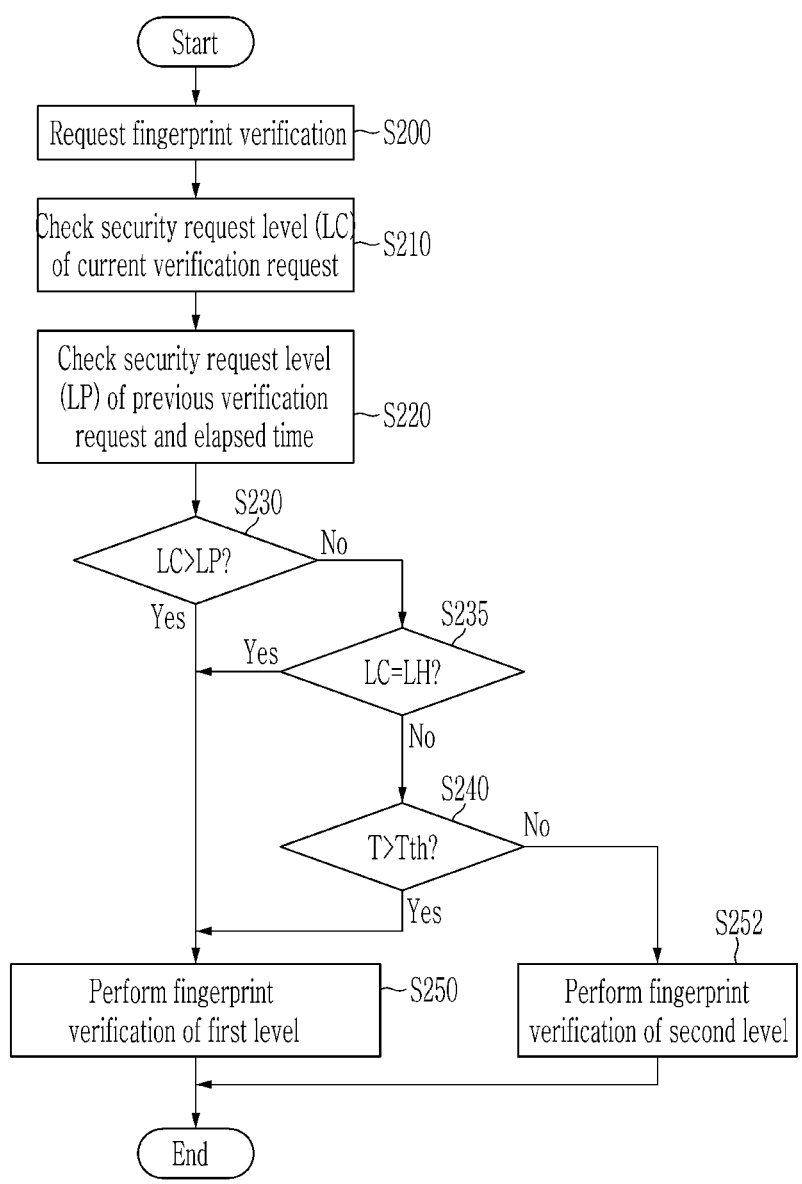
FIG. 13 to FIG. 15 illustrate flowcharts showing a control method of a terminal according to an exemplary embodiment.
Figure 14:
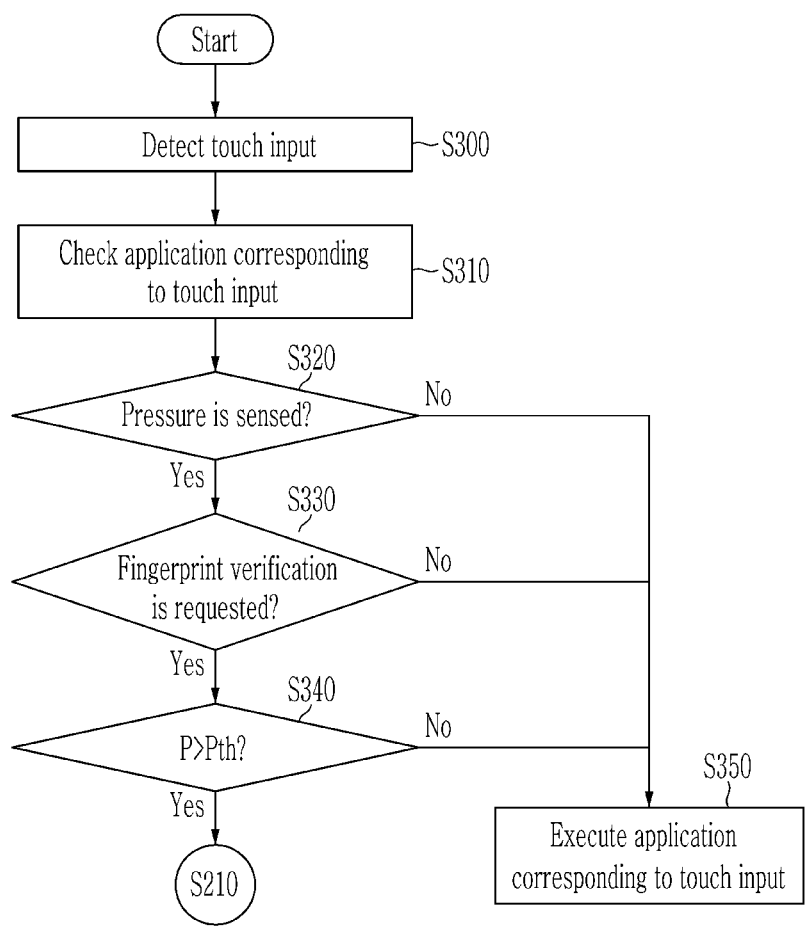
Figure 15:
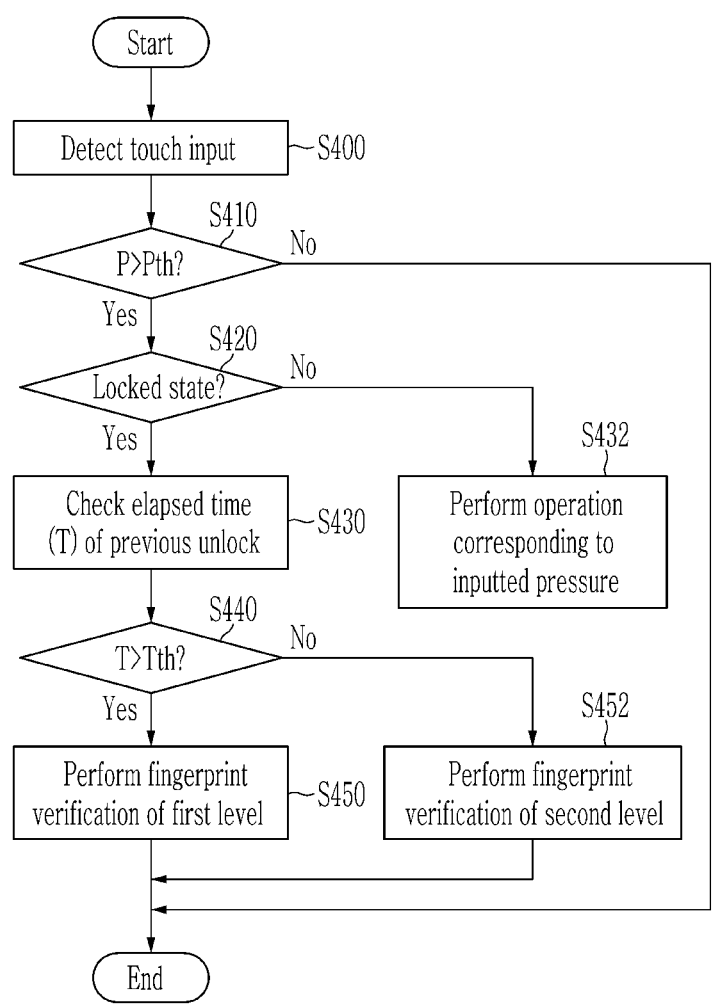

FIG. 13 to FIG. 15 illustrate flowcharts showing a control method of the terminal 100 according to an exemplary embodiment.

First, as illustrated in FIG. 13, fingerprint verification is requested (S200). The fingerprint verification may be requested by a process to be executed or executed on the terminal 100.

For example, when an online banking application is running, fingerprint verification for user verification may be requested in an account inquiry process, an account transfer process, a user login process, or the like.

As another example, when pressure is sensed, fingerprint verification for verification of a user may be requested. The fingerprint verification request step (S200) depending on pressure sensing will be described with reference to FIG. 14.

As illustrated in FIG. 14, when a touch input to the touch area is detected (S300), the controller 170 checks an object positioned in the touch input area (S310).

For example, when a user touches an object of a messenger application displayed on the display unit 150, the controller 170 may detect a touch input and check a messenger application object positioned in an area in which the touch is inputted.

Next, the controller 170 determines whether a touch pressure P is sensed (S320).

As one example, the touch pressure P may be detected by the touch pressure sensor 164. The controller 170 may check whether the touch pressure P is sensed while the touch input continues, by the touch pressure sensor 164. In addition, the controller 170 may check whether the touch pressure P is applied to the area in which the touch is inputted.

As another example, the touch pressure P may be detected by the touch sensor 161. The controller 170 may detect a change in the area of the touch input from when the touch input to the touch area is detected until a predetermined time elapses. Then, the touch pressure P may be detected by using the change in the area of the detected touch input.

Specifically, the controller 170 compares an area of the touch input when the touch input is first detected with an area of the touch input that persists when a predetermined time elapses from when the touch input is first detected. The controller 170 may determine that the touch pressure P is applied when the area of the touch input that persists when the predetermined time elapses is larger than the area of the touch input when the touch input is first detected.

Alternatively, the controller 170 determines that the touch pressure P is applied when the area of the touch input exceeds a predetermined area, and determines that no touch pressure P is applied when the area of the touch input is equal to or less than the predetermined area. This will be described with reference to FIG. 16 and FIG. 17

Figure 16:
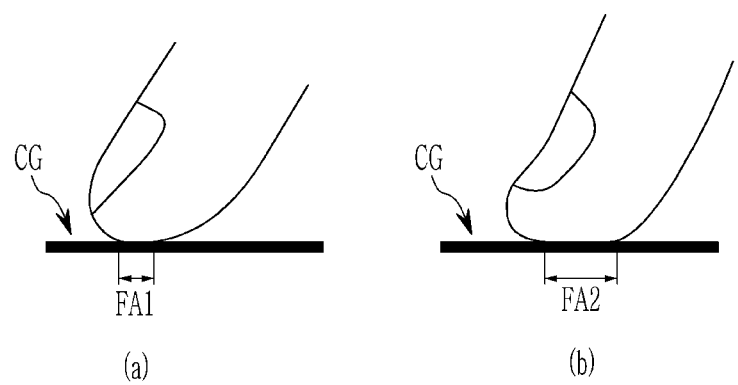
FIG. 16 and FIG. 17 illustrate fingerprint areas that are different depending on pressure.
Figure 17:
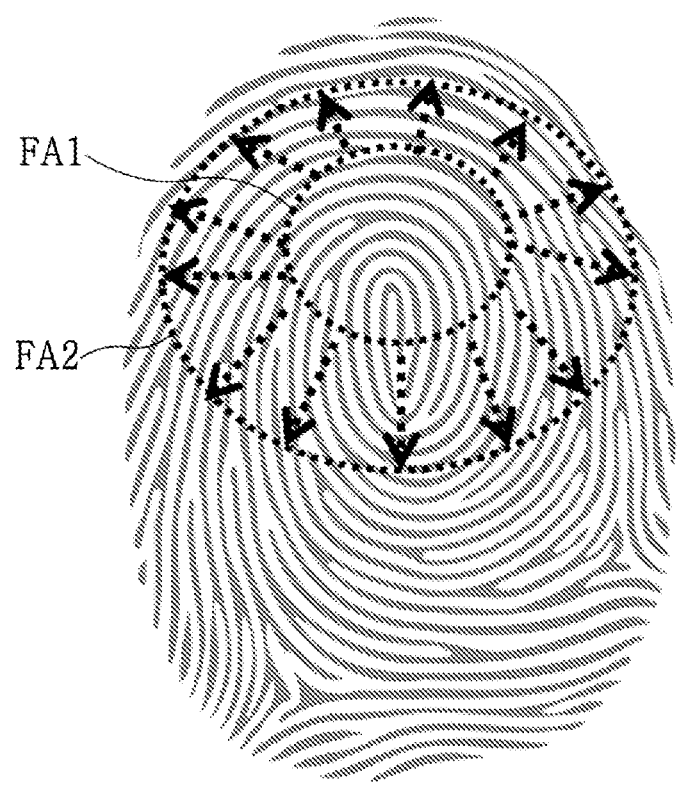

FIG. 16 and FIG. 17 illustrate fingerprint areas that are different depending on pressure. As illustrated in FIG. 16 (*a*), when a user presses a cover glass CG covering the touch sensor panel 1630 at a first intensity by using a finger, a contact area FA1 between skin of the finger and the cover glass CG may be formed. In addition, as illustrated in FIG. 16 (*b*), when the user presses the cover glass CG covering the touch sensor panel 1630 with a second intensity that is greater than the first intensity by using the finger, a contact area FA2 between the skin of the finger and the cover glass CG may be formed.

As illustrated in FIG. 17, the contact area FA2 has a larger area than the contact area FA1. When the user presses the cover glass CG with the finger, the skin of the finger is pressed so that a wider area of the finger contacts the touch area. Then, the fingerprint of the larger area FA2 may be recognized by the fingerprint recognition sensor 162.

Therefore, the controller 170 sets an area between the area of the contact area FA1 and the area of the contact area FA2 as a threshold area, and determines that the touch pressure P with intensity that exceeds a threshold Pth when the area of the touch input detected by the touch sensor 162 exceeds the threshold area.

The touch pressure P may be directly detected by the touch pressure sensor 164, may be detected using an area of the touch input detected by the touch sensor 162, or may be detected by combining the two methods.

When the touch pressure is applied, the controller 170 determines whether a process corresponding to an object requires fingerprint verification (S330). For example, when it is determined that a lock should be released through fingerprint verification when entering a confirmed messenger application, the controller 170 determines that the fingerprint verification is requested.

When the fingerprint verification is requested, the controller 170 determines whether the intensity of the touch pressure P exceeds the threshold value Pth. When the intensity of the touch pressure P exceeds the threshold value Pth, the controller 170 performs step S210.

The controller 170 executes the application (S350) when no pressure is detected in step S320, there is no fingerprint verification request in step S330, or when the intensity of the touch pressure P is less than or equal to the threshold value Pth.

Referring back to FIG. 13, the controller 170 checks a security request level LC of the current fingerprint verification request (S210).

For example, a process that requires high security, such as an online banking application, requires the fingerprint verification with the high security request level. Then, the controller 170 may check the security request level LC of the fingerprint verification request as the first level. Alternatively, a process that requires low security, such as a messenger application, requires the fingerprint verification with the low security request level. Then, the controller 170 may check the security request level LC of the fingerprint verification request as the second level.

Next, the controller 170 checks the security request level LP of the previous fingerprint verification request and an elapsed time T from the previous fingerprint verification request (S220). In this case, the previous fingerprint verification request may be a fingerprint verification request of fingerprint verification that has been completed (i.e., fingerprint verification that has succeeded) before the current fingerprint verification is requested.

For example, the controller 170 may check whether there is fingerprint verification that has been completed just before the current fingerprint verification is requested. In the case where there is fingerprint verification, the controller 170 may check the security request level LP when the fingerprint verification is requested and an elapsed time T from the request (or completion) of the fingerprint verification to the request of the current fingerprint verification.

The controller 170 determines whether the security request level LC of the current fingerprint verification exceeds the security request level LP of the previous fingerprint verification (S230).

When the security request level LC of the current fingerprint verification is less than or equal to the security request level LP of the previous fingerprint verification, the controller 170 determines that the security request level LC of the current fingerprint verification is a specific security request level LH (S235).

For example, in the case of a verification method requiring a high security request level, such as an online banking application, it is desirable to perform fingerprint verification according to a high verification level even when the security request level LC of the current fingerprint verification is the same as the security request level LP of the previous fingerprint verification.

Therefore, when the security request level LC of the current fingerprint verification is the specific security request level LH, the controller 170 performs fingerprint verification depending on the first verification level (S250).

When the security request level LC of the current fingerprint verification is different from the specific security request level LH, the controller 170 determines whether the elapsed time T exceeds the threshold time Tth (S240).

When the elapsed time T exceeds the threshold time Tth, the controller 170 performs fingerprint verification depending on the first verification level (S250), even when the security request level LC of the current fingerprint verification exceeds the security request level LP of the previous fingerprint verification, or the security request level LC of the current fingerprint verification is equal to or less than the security request level LP of the previous fingerprint verification Alternatively, the controller 170 performs fingerprint verification depending on the second verification level (S250) when the security request level LC of the current fingerprint verification is less than or equal to the security request level LP of the previous fingerprint verification, and the elapsed time T does not exceed the threshold time Tth. That is, since fingerprint verification is performed depending on the second verification level, the fingerprint verification may be performed for a shorter time.

According to the terminal control method of the exemplary embodiment, the current fingerprint verification can be performed at the second verification level by checking the security request level of the previous fingerprint verification and the elapsed time from the previous fingerprint verification, so that fingerprint verification may be quickly performed.

In addition, according to the terminal control method of the exemplary embodiment, when the touch pressure P exceeds the threshold Pth, fingerprint verification is performed, so that the area where the finger touches the touch area may be further extended. This will be described together with reference to FIG. 16 and FIG. 17 again.

As illustrated in FIG. 16 (*a*), when a user presses a cover glass CG covering the touch sensor panel 1630 at a first intensity by using a finger, a contact area FA1 between skin of the finger and the cover glass CG may be formed. In addition, as illustrated in FIG. 16 (*b*), when a user presses the cover glass CG covering the touch sensor panel 1630 at a second intensity by using a finger, a contact area FA2 between skin of the finger and the cover glass CG may be formed.

As illustrated in FIG. 17, the contact area FA2 has a larger area than the contact area FA1. When the user presses the cover glass CG with the finger, the skin of the finger is pressed so that a wider area of the finger contacts the touch area. Then, the fingerprint of the larger area FA2 may be recognized by the fingerprint recognition sensor 162. A fingerprint image of the larger area FA2 may include more feature information required for fingerprint verification than the fingerprint image of the smaller area. Therefore, according to the exemplary embodiment, there is an effect that fingerprint matching may be more accurately performed.

Next, as illustrated in FIG. 15, when the touch pressure for the touch area is detected (S400), the controller 170 determines whether intensity of the touch pressure P exceeds the threshold Pth (S410).

When the intensity of the touch pressure P exceeds the threshold value Pth, the controller 170 determines whether the terminal 100 is in a locked state (S420).

When the terminal 100 is in the locked state, the controller 170 checks an elapsed time T from a previous unlocking time (S430). The controller 170 determines whether the elapsed time T exceeds the threshold time Tth (S440).

Meanwhile, when the terminal 100 is not in the locked state, the controller 170 performs an operation corresponding to input pressure (S432).

When the elapsed time T exceeds the threshold time Tth, the controller 170 performs fingerprint verification according to the first verification level (S450).

When the elapsed time T does not exceed the threshold time Tth, the controller 170 performs fingerprint verification depending on the first verification level (S452). That is, since fingerprint verification is performed depending on the second verification level, the fingerprint verification may be performed for a shorter time.

According to the terminal control method of the exemplary embodiment, in the case of the locked state, the fingerprint verification is performed depending on the input touch pressure, but an elapsed time from previous unlock is checked, and the current fingerprint verification may be performed at the second verification level, so that the fingerprint verification may be quickly performed and the terminal 100 may be conveniently unlocked.

The present invention described above may be embodied as computer readable codes on a medium in which a program is recorded. The computer-readable medium includes all kinds of recording devices that store data that can be read by a computer system. Examples of media that can be read by a computer include a hard disk drive (HDD), a solid state disk (SSD), a silicon disk drive (SDD), a ROM, a RAM, a CD-ROM, a magnetic tape, a floppy disk, and an optical data storage device, and this also includes those implemented in the form of carrier waves (e.g., transmission over the Internet). In addition, the computer may include a controller of the terminal. Accordingly, the above detailed description should not be construed as limiting in any aspects, and should be considered as illustrative. The scope of the present invention should be determined by reasonable interpretation of the appended claims, and all changes within the equivalent range of the present invention are included in the scope of the present invention.

What is claimed is:

1. A terminal comprising:
a fingerprint recognition sensor configured to acquire a fingerprint image; and
a controller configured to check a security request level of a fingerprint verification request when the fingerprint verification request is received, to determine a verification level depending on the security request level, and to perform fingerprint verification in a manner corresponding to the verification level by using the fingerprint image,
wherein
the controller controls the fingerprint recognition sensor to acquire a fingerprint image of a first level when the security request level is less than or equal to the security request level of a previous verification request that has been completed before the fingerprint verification request, and an elapsed time from the previous verification request is within a threshold time, and
the fingerprint image of the first level includes any one of a low resolution fingerprint image, a small area fingerprint image, and a small area low resolution fingerprint image.

2. The terminal of claim 1, wherein
the fingerprint recognition sensor includes a touch driver configured to include a plurality of Tx channels extending in a first direction and arranged in a second direction crossing the first direction, a plurality of Rx channels extending in the second direction and arranged in the first direction, and a touch driver for receiving a sensing signal from at least one of the Rx channels, and
the touch driver supplies a driving signal to a Tx channel selected among the Tx channels to acquire the fingerprint image of the first level under control of the controller.

3. The terminal of claim 1, wherein
the fingerprint recognition sensor includes a plurality of touch electrodes arranged in a matrix form, and a touch driver for supplying a driving signal to at least one of the touch electrodes, and receiving a sensing signal from at least one of the touch electrodes, and
the touch driver supplies a driving signal to a touch electrode selected among the touch electrode to acquire the fingerprint image of the first level under control of the controller.

4. The terminal of claim 1, further comprising:
a display unit;
a touch sensor configured to detect a touch input; and
a pressure sensor configured to sense a touch pressure,
wherein the controller determines that the fingerprint verification request is received by using the touch input and the touch pressure.

5. The terminal of claim 1, further comprising:
a display unit; and
a touch sensor configured to detect a touch input,
wherein the controller determines that a touch pressure with intensity that exceeds a threshold value is applied when an area of the touch input exceeds a predetermined area, and determines that the fingerprint verification request is received by using the touch input and the touch pressure.

6. The terminal of claim 5, wherein
the controller detects an object displayed on an area of the display unit corresponding to the touch input when the touch input is detected, and
determines that the fingerprint verification request is received when the intensity of the touch pressure exceeds the threshold value in the case where a process corresponding to the object requests fingerprint verification.

7. The terminal of claim 5, wherein
the controller performs at least one of operations of: acquiring a low-resolution fingerprint image, acquiring characteristic information of some types among types of characteristic information that are obtainable from the fingerprint image; and determining that the fingerprint is verified when a first accuracy is satisfied when the touch input is detected, the intensity of the touch pressure exceeds a threshold value, and an elapsed time from a previous unlock is within a threshold time in the case where the terminal is locked.

8. A terminal comprising:
a fingerprint recognition sensor configured to acquire a fingerprint image; and
a controller configured to check a security request level of a fingerprint verification request when the fingerprint verification request is received, to determine a verification level depending on the security request level, and to perform fingerprint verification in a manner corresponding to the verification level by using the fingerprint image,
wherein
the controller acquires some types of feature information from types of feature information that are obtainable from the fingerprint image when the security request level is less than or equal to the security request level of a previous verification request that has been completed before the fingerprint verification request, and an elapsed time from the previous verification request is within a threshold time.

9. The terminal of claim 8, wherein
the obtainable types of characteristic information include a bifurcation point, an end point, a core, a delta, a vector of ridges, and a vector of valleys.

10. A terminal comprising:
a fingerprint recognition sensor configured to acquire a fingerprint image; and
a controller configured to check a security request level of a fingerprint verification request when the fingerprint verification request is received, to determine a verification level depending on the security request level, and to perform fingerprint verification in a manner corresponding to the verification level by using the fingerprint image, wherein
the controller
determines that the fingerprint is verified when a first accuracy is satisfied in the case where the security request level is less than or equal to the security request level of a previous verification request that has been completed before the fingerprint verification request, and an elapsed time from the previous verification request is within a threshold time, or
determines that the fingerprint is verified when a second accuracy that is higher than the first accuracy is satisfied in the case where either the security request level exceeds the security request level of the previous verification request or the elapsed time exceeds the threshold time while the security request level is less than or equal to the security request level of the previous verification request.

11. A control method of a terminal, the control method comprising:
receiving a fingerprint verification request;
checking a security request level of the fingerprint verification request, and determining a verification level depending on the security request level; and
performing fingerprint verification in a manner corresponding to the verification level by using a fingerprint image acquired by a fingerprint recognition sensor;
wherein
the determining of the verification level includes:
determining whether the security request level is less than or equal to the security request level of a previous verification request that has been completed before the fingerprint verification request; and
determining whether an elapsed time from the previous verification request is within a threshold time.

12. The control method of claim 11, wherein
the performing of the fingerprint verification includes controlling the fingerprint recognition sensor to acquire a fingerprint image of a first level when the security request level is less than or equal to the security request level of a previous verification request that has been completed before the fingerprint verification request, and the elapsed time is within the threshold time, and
the fingerprint image of the first level includes any one of a low resolution fingerprint image, a small area fingerprint image, and a small area low resolution fingerprint image.

13. The control method of claim 12, wherein
the controlling of the fingerprint recognition sensor includes supplying a driving signal to a Tx channel selected among a plurality of Tx channels to acquire the fingerprint image of the first level when the fingerprint recognition sensor includes the plurality of Tx channels extending in a first direction and arranged in a second direction crossing the first direction, and a plurality of Rx channels extending in the second direction and arranged in the first direction.

14. The control method of claim 12, wherein
the controlling of the fingerprint recognition sensor includes supplying a driving signal to a touch electrode selected among a plurality of touch electrodes to acquire the fingerprint image of the first level when the fingerprint recognition sensor includes the plurality of touch electrodes.

15. The control method of claim 11, wherein
the performing of the fingerprint verification includes acquiring some types of feature information from types of feature information that are obtainable from the fingerprint image when the security request level is less than or equal to the security request level of a previous verification request that has been completed before the fingerprint verification request, and the elapsed time is within the threshold time, and
the obtainable types of characteristic information include a bifurcation point, an end point, a core, a delta, a vector of ridges, and a vector of valleys.

16. The control method of claim 11, wherein
the performing of the fingerprint verification includes determining that the fingerprint is verified when a first accuracy is satisfied in the case where the security request level is less than or equal to the security request level of a previous verification request that has been completed before the fingerprint verification request, and the elapsed time is within the threshold time, or determining that the fingerprint is verified when a second accuracy that is higher than the first accuracy is satisfied in the case where the security request level exceeds the security request level of the previous verification request, or the elapsed time exceeds the threshold time while the security request level is less than or equal to the security request level of the previous verification request.

17. The control method of claim 11, wherein the receiving of the fingerprint verification request includes:

detecting a touch input on a display unit;

detecting an object displayed in an area of the display unit corresponding to the touch input; and determining that the fingerprint verification request is received when an intensity of touch pressure caused by the touch input exceeds a threshold value in the case where a process corresponding to the object requests fingerprint verification.

18. The control method of claim 11, wherein the receiving of the fingerprint verification request includes:

detecting a touch input on a display unit;

detecting an object displayed in an area of the display unit corresponding to the touch input; and determining that the fingerprint verification request is received when the area of the touch input exceeds a threshold value in the case where a process corresponding to the object requests fingerprint verification.

* * * * *